(12) United States Patent
Clanney et al.

(10) Patent No.: US 10,720,053 B1
(45) Date of Patent: Jul. 21, 2020

(54) BUSWAY CROSSING WARNING SYSTEM AND METHOD FOR CONTROLLING BUSWAY CROSSING TRAFFIC

(71) Applicant: Siemens Mobility, Inc., New York, NY (US)

(72) Inventors: Nathan Clanney, Corona, CA (US); A. Nathan Edds, La Grange, KY (US)

(73) Assignee: Siemens Mobility, Inc., New York, NY (US)

( * ) Notice: Subject to any disclaimer, the term of this patent is extended or adjusted under 35 U.S.C. 154(b) by 0 days.

(21) Appl. No.: 16/371,875

(22) Filed: Apr. 1, 2019

Related U.S. Application Data

(60) Provisional application No. 62/813,794, filed on Mar. 5, 2019.

(51) Int. Cl.
| | | |
|---|---|---|
| *G08G 1/095* | (2006.01) | |
| *G08G 1/07* | (2006.01) | |
| *G08G 1/16* | (2006.01) | |
| *G06Q 50/30* | (2012.01) | |
| *H05B 47/16* | (2020.01) | |

(52) U.S. Cl.
CPC ............... *G08G 1/07* (2013.01); *G06Q 50/30* (2013.01); *G08G 1/095* (2013.01); *G08G 1/166* (2013.01); *H05B 47/16* (2020.01)

(58) Field of Classification Search
None
See application file for complete search history.

(56) References Cited

U.S. PATENT DOCUMENTS 4,321,589 A * 3/1982 King ...................... G08G 1/087
340/384.7

* cited by examiner

*Primary Examiner* — Adolf Dsouza

(57) ABSTRACT

A busway crossing warning system includes an approach tag reader, a crossing controller and a bus signal device. The approach tag reader is located in a bus lane on a road at a distance from an entrance of an intersection in a direction prior to a bus approaching the intersection, the bus being equipped with an identification tag. The approach tag reader detects the bus with the identification tag when the bus drives over the approach tag reader and sends out an approach signal to the crossing controller indicating the bus is approaching the intersection. The crossing controller activates bus signal device after receiving the approach signal to inform the bus is detected.

20 Claims, 2 Drawing Sheets

BUSWAY CROSSING WARNING SYSTEM AND METHOD FOR CONTROLLING BUSWAY CROSSING TRAFFIC

TECHNICAL FIELD OF THE INVENTION

This invention relates generally to a busway crossing warning system and a method for controlling a busway crossing traffic.

DESCRIPTION OF THE RELATED ART

Designated bus lanes are intended to keep buses moving along safely and on-schedule. These bus lanes are sometimes used solely by buses, but may also be used by other vehicles, such as emergency vehicles in some circumstances. The ability for buses to remain on schedule, even when the bus lanes are dedicated solely to buses, can be negatively impacted by traffic signals and blocked intersections that prevent buses from moving through the intersections in a timely manner. A solution is needed to enable the buses and emergency vehicles to activate the traffic signals using a crossing warning system such that the buses and emergency vehicles may pass through the intersections without delay.

SUMMARY OF THE INVENTION

Briefly described, aspects of the present invention relate to a busway crossing warning system and a method for controlling a busway crossing traffic.

According to an aspect, a busway crossing warning system is presented. The system comprises an approach tag reader located in a bus lane on a road at a distance from an entrance of an intersection in a direction prior to a bus approaching the intersection. The bus is equipped with an identification tag. The system comprises a crossing controller communicationally connected with the approach tag reader. The system comprises a bus signal device communicationally connected with the crossing controller. The approach tag reader is configured to detect the bus with the identification tag when the bus drives over the approach tag reader and send out an approach signal to the crossing controller indicating the bus is approaching the intersection. The crossing controller is configured to activate the bus signal device after receiving the approach signal to inform the bus is detected.

According to an aspect, a method for controlling a busway crossing traffic is presented. The method comprises arranging an approach tag reader located in a bus lane on a road at a distance from an entrance of an intersection in a direction prior to a bus approaching the intersection. The bus is equipped with an identification tag. The method comprises detecting the bus with the identification tag by the approach tag reader when the bus drives over the approach tag reader. The method comprises sending out an approach signal by the approach tag reader to a crossing controller indicating the bus is approaching the intersection. The crossing controller is communicationally connected with the approach tag reader. The method comprises activating a bus signal device by the crossing controller after receiving the approach signal to inform the bus is detected. The bus signal device is communicationally connected with the crossing controller.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF THE INVENTION

A detailed description related to aspects of the present invention is described hereafter with respect to the accompanying figures.

Figure 1:
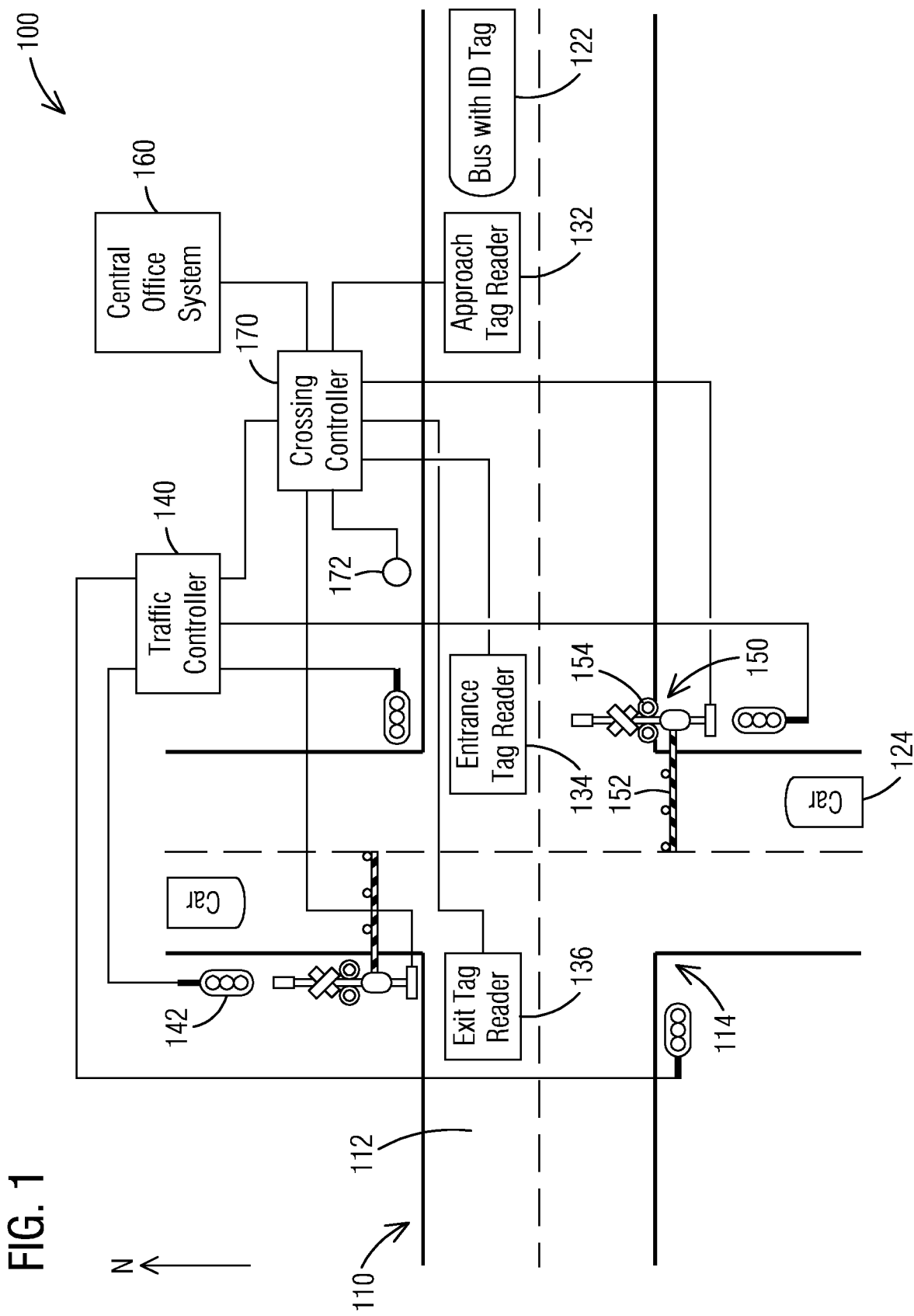
FIG. 1 is a schematic diagram of a busway crossing warning system according to an embodiment of the present invention.

FIG. 1 illustrates a schematic diagram of a busway crossing warning system 100 according to an embodiment of the present invention. The busway crossing warning system 100 may include at least a tag reader located in a lane 112 on a road 110. The lane 112 may be a regular traffic lane for any vehicles, or a designated bus lane for buses and emergency vehicles only. In the exemplary embodiment shown in FIG. 1, the busway crossing warning system 100 includes an approach tag reader 132, an entrance tag reader 134, and an exit tag reader 136. The approach tag reader 132 may be located at a distance from an entrance of an intersection 114 in a direction prior to a bus 122 approaching the intersection 114. The distance may be enough to provide a time period for the bus 122 to arrive the intersection 114 at an expected rate of speed. The time period is enough for the crossing warning system 100 to react such that the bus 122 can drive through the intersection 114 without stop. The entrance tag reader 134 may be located at the entrance of the intersection 114. The exit tag reader 136 may be located at an exit of the intersection 114. The bus 122 is equipped with an identification (ID) tag that can be detected by the approach tag reader 132, the entrance tag reader 134, and the exit tag reader 136. Each tag reader scans the bus 122 as it travels over the reader and sends out a corresponding signal. The approach tag reader 132 sends out an approach signal indicating the bus 122 is approaching the intersection 114. The entrance tag reader 132 sends out an enter signal indicating the bus 122 is entering the intersection 114. The exit tag reader 132 sends out an exit signal indicating the bus 122 is exiting the intersection 114.

The ID tag equipped on the bus 122 may include any types of identification system, such as a Radio Frequency Identification (RFID) tag, a barcode, etc. For illustration purpose, the exemplary embodiment uses the RFID tag. It is understood that any other types of identification system, such as barcode, may be implemented into the illustrated exemplary embodiment.

In the exemplary embodiment shown in FIG. 1, the bus 122 approaches the intersection 114 from east to west direction. The approach tag reader 132 is located in the east side of the intersection 114 at a distance prior to the bus 122 approaching the intersection 114. It is understood that the bus 122 may approach the intersection 114 in any directions.

For example, if the bus 122 approaches the intersection 114 from west to east direction, an approach tag reader (not shown) may be located in the west side of the intersection 114 at a distance from the entrance of the intersection 114 in a direction prior to the bus 122 approaching the intersection 114. The exit tag reader 136 may function as an entrance tag reader. The entrance tag reader 134 may function as an exit tag reader. Similar busway crossing warning systems 100 may be correspondingly arranged according to directions along which the bus 122 approaches the intersection 114.

The busway crossing warning system 100 includes a traffic controller 140. The traffic controller 140 communicates with traffic signals 142 located on the intersection 114 to control a flow of traffic passing the intersection 114 in a typical manner.

The busway crossing warning system 100 includes a crossing warning device 150. The crossing warning device 150 may include a gate arm 152, a flashing light 154. The crossing warning device 150 may also include a bell (not shown). In the exemplary embodiment shown in FIG. 1, two crossing warning devices 150 are located on two sides of the intersection 114 in a direction that intersects with the bus lane 112. Once the crossing warning devices 150 are activated, the gate arms 152 are lowered and the flashing lights 154 are flashing and the bell is switched on. The activated crossing warning devices 150 warn oncoming regular public traffic without ID tags, such as cars 124, approaching the intersection 114 along the direction crossing with the bus lane 112, that a bus 122 is approaching the intersection 114 and will not be stopping.

The busway crossing warning system 100 includes a central office system 160. The central office system 160 may receive messages of buses 122 with ID tags when the buses 122 drive over the tag readers 132, 134 and 136. The central office system 160 may log the time and locations of the bus 122 to track the bus 122.

The busway crossing warning system 100 includes a crossing controller 170. The crossing controller 170 communicates with the approach tag reader 132, the entrance tag reader 134, and the exit tag reader 136 using a wireless communication or a wired communication. The crossing controller 160 also communicates with the traffic controller 140 using a wirelessly communication or a wired communication. The crossing controller 160 also communicates with the crossing warning devices 150 using a wireless communication or a wired communication.

The busway crossing warning system 100 includes a bus signal device 172. The bus signal device 172 informs a bus driver whether the bus 122 is detected by an approach tag reader 132 and the crossing warning system 100 is activated. When the bus 122 with an ID tag drives over the approach tag reader 132, the bus signal device 172 is activated to inform the bus driver that the bus 122 is detected and the crossing warning system 100 is activated. If the bus signal device 172 is not activated when the bus 122 with an ID tag drives over the approach tag reader 132, the bus driver must assume the bus 122 is not detected or the crossing warning system 100 is not active. The bus driver must proceed to the intersection 114 expecting a stop traffic signal 142 when approaching the intersection 144 and stops the bus 122 at the intersection 144 if it is a stop traffic signal 142. When the bus 122 drives over an entrance tag reader 134, the bus signal device 172 may be deactivated. Alternatively, the bus signal device 172 may be deactivated when the bus 122 drives over an exit tag reader 136. The bus signal device 172 may be located in the bus lane 112 on the road 110 between the approach tag reader 132 and the entrance tag reader 134 and is visible to the bus driver. The bus signal device 172 may be installed in the bus 122 and is visible to the bus driver. The bus signal device 172 communicates with the crossing controller 170 using a wireless communication or a wired communication. The bus signal device 172 may be a lamp that can be switched on and off or can flash.

Figure 2:
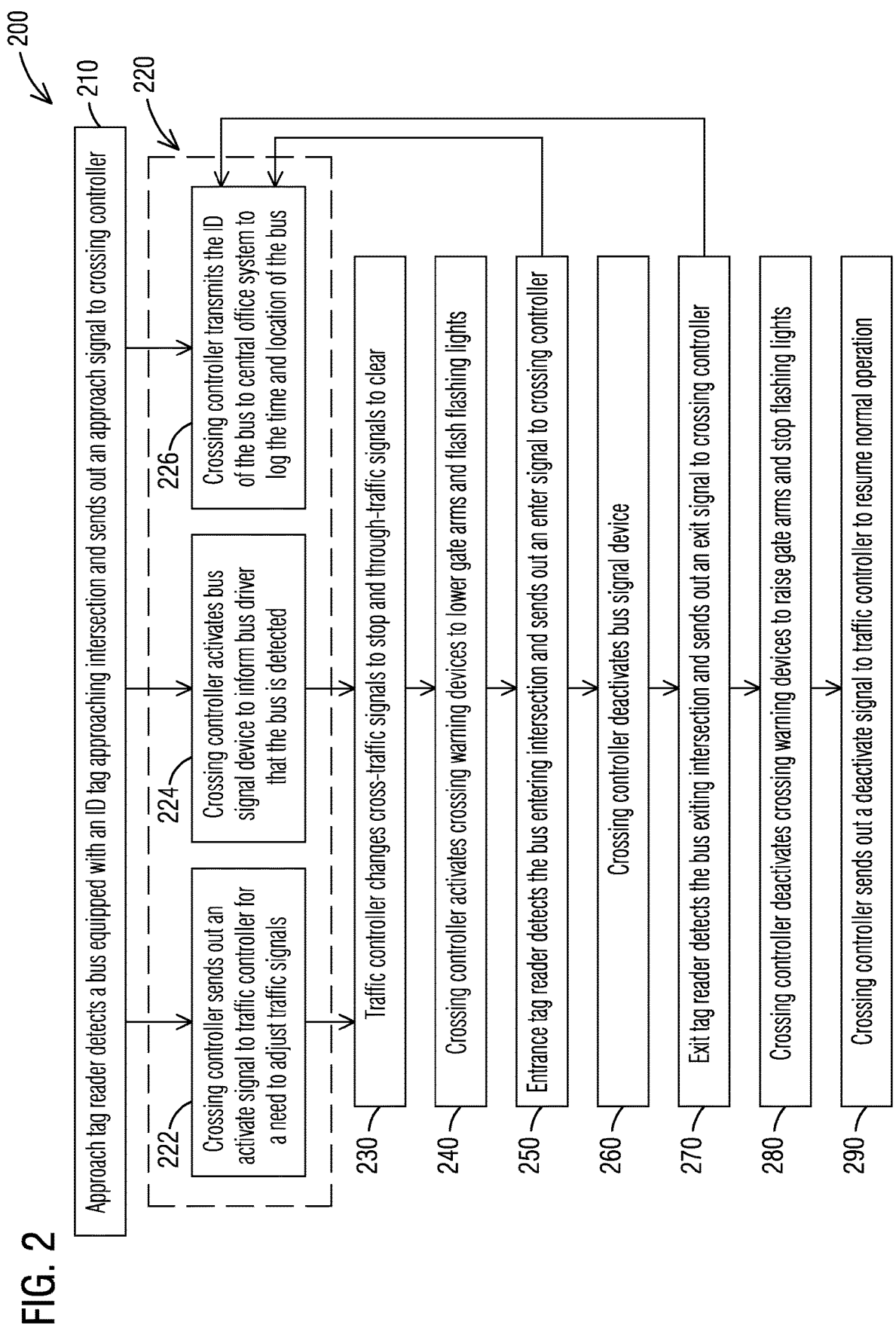
FIG. 2 is a schematic flowchart for controlling a busway crossing traffic at an intersection according to an embodiment of the present invention.

FIG. 2 is a schematic flowchart 200 for controlling a busway crossing traffic using the proposed busway crossing warning system 100 according to an embodiment of the present invention. In step 210, a bus 122 equipped with an ID tag drives over an approach tag reader 132 and moves in a direction approaching an intersection 114. The approach tag reader 132 detects the bus 122 with the ID tag. The approach tag reader 132 sends out an approach signal to the crossing controller 170 indicating the bus 122 with the ID tag is approaching the intersection 144. The busway crossing warning system 100 is activated.

A following step 220 may include a plurality of sub steps. In sub step 222, the crossing controller 170 sends out an activate signal to a traffic controller 140 informing the traffic controller 140 that traffic signals 142 may need to be adjusted for the approaching bus 122 to drive through the intersection 114 without stop. In sub step 224, the crossing controller 170 activates a bus signal device 172. The activated bus signal device 172 informs a bus driver that the bus 122 is detected and the crossing warning system 100 is activated. If the bus signal device 172 is not activated, the bus driver must assume the bus 122 is not detected or the crossing warning system 100 is not active. The bus driver must proceed to the intersection 114 expecting a stop traffic signal 142 when approaching the intersection 144 and stops the bus 122 at the intersection 144 if it is a stop traffic signal 142. In sub step 226, the crossing controller 170 transmits the ID of the bus 122 to the central office system 160. The central office system 160 may log the time and location of the bus 122 with the ID. The sub steps 222, 224 and 226 may be parallel steps. The sub steps 222, 224 and 226 may also be sequential steps in any order.

In step 230, the traffic controller 142 changes cross-traffic signals 142 to stop and through-traffic signals 142 to clear which allows the bus 122 to pass through the intersection 114 without stop. A time period may be needed for the traffic controller 142 to adjust the traffic signals 142.

In step 240, the crossing controller 160 activates the crossing warning devices 150. The activation of the crossing warning devices 150 may include lowering the gate arms 152 and flashing the flashing lights 154 and switching on a bell if it is available. The crossing controller 170 may wait a suitable delay before activating the crossing warning devices 150. The delay gives the traffic controller 140 the time period needed to change the traffic signals 142.

In step 250, the bus 122 drives over an entrance tag reader 134. The entrance tag reader 134 detects the bus 122. The entrance tag reader 134 sends out an enter signal to the crossing controller 170 indicating the bus 122 is entering the intersection 144.

In step 260, the crossing controller 170 deactivates the bus signal device 172. The cross controller 170 may transmit the ID of the bus 122 to the central office system 160 to log the time and location of the bus 122 with the ID.

In step 270, the bus 122 drives over an exit tag reader 136. The exit tag reader 136 detects the bus 122. The exit tag reader 136 sends out an exit signal to the crossing controller 170 indicating the bus 122 is exiting the intersection 144.

In step 280, the crossing controller 170 deactivates the crossing warning devices 150. The deactivation of the crossing warning devices 150 may include raising the gate arms 152 and stopping the flashing lights 154 and switching off the bell if it is available. The cross controller 170 may transmit the ID of the bus 122 to the central office system 160 to log the time and location of the bus 122 with the ID.

In step 290, the crossing controller 170 sends out a deactivate signal to the traffic controller 140. The traffic controller 140 resumes normal operation of traffic signals 142 at the intersection 114 in a typical manner. The busway crossing warning system 100 is deactivated.

According to an aspect, the proposed busway crossing warning system 100 may provide an intelligent bus traffic control system using a concept of Internet of Things (IoT). The bus 122 equipped with the ID tag, the approach tag reader 132, the entrance tag reader 134, the exit tag reader 136, the traffic controller 140, the traffic signal 142, the crossing warning device 150, the central office system 160, the crossing controller 170, and the bus signal 172 may all be IoT devices and are connected in a network of the intelligent traffic control system. The central office system 160 may track time and locations of the bus 122 using the ID of the bus 122.

According to an aspect, the proposed busway crossing warning system 100 prioritizes bus traffic in a bus lane 112 over cross traffic at an intersection 114 without delay for buses 122. The proposed busway crossing warning system 100 may also prioritize emergency vehicles at the intersection 114 without delay. Only buses 122 or emergency vehicles that are equipped with ID tags can activate the crossing warning system 100. There is no risk of regular public traffic without ID tags triggering the proposed busway crossing warning system 100 by accident.

According to an aspect, the proposed busway crossing warning system 100 provides a safe operation of bus traffic at an intersection 114. Safety of the proposed busway crossing warning system 100 is achieved by feedback provided by a bus signal device 172 and a traffic signal 142. If the bus signal device 172 is not activated when a bus 122 with an ID tag drives over an approach tag reader 132, a bus driver must assume the bus 122 is not detected or the busway crossing warning system 100 is not active. The bus driver must proceed to the intersection 114 expecting a stop traffic signal 142 when approaching the intersection 144 and stops the bus 122 at the intersection 144 if it is a stop traffic signal 142. Safety of operating the proposed busway crossing warning system 100 is thus ensured if the approach tag reader 132 fails or the busway crossing warning system 100 is not online.

According to an aspect, the proposed busway crossing warning system 100 may be easily changed over to a railway system to control train traffic on rails. The proposed busway crossing warning system 100 may be installed at an intersection 114 of a railroad track with a road 110 to prioritize train traffic on rails over cross traffic on the road 110 without delay for the train traffic at the intersection 114.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Busway Crossing Warning System
110: Road
112: Bus Lane
114: Intersection
122: Bus with Identification Tag
124: Vehicles without Identification Tag
132: Approach Tag Reader
134: Entrance Tag Reader
136: Exit Tag Reader
140: Traffic Controller
142: Traffic Signal
150: Crossing Warning Device
152: Gate Arm
154: Flashing Light
160: Central Office System
170: Crossing Controller
172: Bus Signal Device
200: Flowchart

What is claimed is:

1. A busway crossing warning system comprising:
an approach tag reader located in a bus lane on a road at a distance from an entrance of an intersection in a direction prior to a bus approaching the intersection, wherein the bus is equipped with an identification tag;
a crossing controller communicationally connected with the approach tag reader; and
a bus signal device communicationally connected with the crossing controller,
wherein the approach tag reader is configured to detect the bus with the identification tag when the bus drives over the approach tag reader and send out an approach signal to the crossing controller indicating the bus is approaching the intersection,
wherein the crossing controller is configured to activate the bus signal device after receiving the approach signal to inform the bus is detected.

2. The system as claimed in claim 1, further comprising:
a traffic controller communicationally connected with the crossing controller,
wherein the crossing controller is configured to send out an activate signal to the traffic controller after receiving the approach signal for a need to adjust traffic signals, and
wherein the traffic controller is configured to change cross-traffic signals at the intersection to stop and through-traffic signals at the intersection for the bus to clear.

3. The system as claimed in claim 1, further comprising:
a crossing warning device located at the intersection in a direction cross the bus lane,
wherein the crossing warning device is communicationally connected with the crossing controller, and
wherein the crossing controller is configured to activate the crossing warning device after receiving the approach signal.

4. The system as claimed in claim 3, wherein the crossing warning device comprises a gate arm, and wherein the activation of the crossing warning device comprises lowering the gate arm.

5. The system as claimed in claim 3, wherein the crossing warning device comprises a flashing light, and wherein the activation of the crossing warning device comprises flashing the flashing light.

6. The system as claimed in claim 1, further comprising:
an entrance tag reader located at the entrance of the intersection,
wherein the entrance tag reader is communicationally connected with the crossing controller,
wherein the entrance tag reader is configured to detect the bus with the identification tag when the bus drives over the entrance tag reader and send out an enter signal to the crossing controller indicating the bus is entering the intersection, and
wherein the crossing controller is configured to deactivate the bus signal device after receiving the enter signal.

7. The system as claimed in claim 1, further comprising:
an exit tag reader located at an exit of the intersection,
wherein the exit tag reader is communicationally connected with the crossing controller, and
wherein the exit tag reader is configured to detect the bus with the identification tag when the bus drives over the exit tag reader and send out an exit signal to the crossing controller indicating the bus is exiting the intersection,
wherein the crossing controller is configured to deactivate a crossing warning device communicationally connected with the crossing controller after receiving the exit signal,
wherein the crossing controller is configured to send out a deactivate signal to a traffic controller communicationally connected with the crossing controller, and
wherein the traffic controller is configured to resume normal operation of traffic signals at the intersection after receiving the deactivate signal.

8. The system as claimed in claim 1, further comprising:
a central office system communicationally connected with the crossing controller,
wherein the crossing controller is configured to transmit the identification of the bus to the central office system, and
wherein the central office system is configured to track the bus with the identification of the bus.

9. A method for controlling a busway crossing traffic comprising:
arranging an approach tag reader located in a bus lane on a road at a distance from an entrance of an intersection in a direction prior to a bus approaching the intersection, wherein the bus is equipped with an identification tag;
detecting the bus with the identification tag by the approach tag reader when the bus drives over the approach tag reader;
sending out an approach signal by the approach tag reader to a crossing controller indicating the bus is approaching the intersection, wherein the crossing controller is communicationally connected with the approach tag reader; and
activating a bus signal device by the crossing controller after receiving the approach signal to inform the bus is detected, wherein the bus signal device is communicationally connected with the crossing controller.

10. The method as claimed in claim 9, further comprising:
sending out an activate signal to a traffic controller by the crossing controller after receiving the approach signal for a need to adjust traffic signals, wherein the traffic controller is communicationally connected with the crossing controller; and
changing cross-traffic signals at the intersection to stop and through-traffic signals at the intersection for the bus to clear by the traffic controller after receiving the activate signal.

11. The method as claimed in claim 9, further comprising:
activating a crossing warning device by the crossing controller after receiving the approach signal,
wherein the crossing warning device is located at the intersection in a direction cross the bus lane and communicationally connected with the crossing controller.

12. The method as claimed in claim 11, wherein the crossing warning device comprises a gate arm, and wherein the activation of the crossing warning device comprises lowering the gate arm.

13. The method as claimed in claim 11, wherein the crossing warning device comprises a flashing light, and wherein the activation of the crossing warning device comprises flashing the flashing light.

14. The method as claimed in claim 9, further comprising:
arranging an entrance tag reader located at the entrance of the intersection, wherein the entrance tag reader is communicationally connected with the crossing controller;
detecting the bus with the identification tag by the entrance tag reader when the bus drives over the entrance tag reader;
sending out an enter signal to the crossing controller indicating the bus is entering the intersection; and
deactivating the bus signal device by the crossing controller after receiving enter signal.

15. The method as claimed in claim 9, further comprising:
arranging an exit tag reader located at an exit of the intersection, wherein the exit tag reader is communicationally connected with the crossing controller;
detecting the bus with the identification tag by the exit tag reader when the bus drives over the exit tag reader; and
sending out an exit signal to the crossing controller indicating the bus is exiting the intersection.

16. The method as claimed in claim 15, further comprising:
deactivating a crossing warning device by the crossing controller after receiving the exit signal,
wherein the crossing warning device is located at the intersection in a direction cross the bus lane and communicationally connected with the crossing controller.

17. The method as claimed in claim 16, wherein the crossing warning device comprises a gate arm, and wherein the deactivation of the crossing warning device comprises raising the gate arm.

18. The method as claimed in claim 16, wherein the crossing warning device comprises a flashing light, and wherein the deactivation of the crossing warning device comprises stopping the flashing light.

19. The method as claimed in claim 15, further comprising:
sending out a deactivate signal to a traffic controller by the crossing controller after receiving the exit signal, wherein the traffic controller is communicationally connected with the crossing controller; and resuming a normal operation of traffic signals at the intersection by the traffic controller.

20. The method as claimed in claim 9, further comprising:

transmitting the identification of the bus to a central office system by the crossing controller, wherein the central office system is communicationally connected with the crossing controller; and tracking the bus with the identification by the central office system.

\* \* \* \* \*